Sept. 30, 1958 W. BESEL 2,853,886
METAL CHAINS
Filed June 10, 1955

INVENTOR
Wilhelm Besel
BY
ATTORNEY

United States Patent Office 2,853,886
Patented Sept. 30, 1958

2,853,886

METAL CHAINS

Wilhelm Besel, Bad Homburg, Germany, assignor to Werner Reimers, Bad Homburg, Germany Application June 10, 1955, Serial No. 514,640

Claims priority, application Germany June 10, 1954

2 Claims. (Cl. 74—236)

This invention relates to metal chains for toothed wheel driving systems, with transversely displaceable steel laminae in each chain link.

Chains are known for the transmission of power in continuously regulatable gears with a shaft of constant speed and a shaft of variable speed, on each of which there is mounted a pair of conical driving discs associated with gearing. In the links of such chains, a pile of laminae, which lies between two end plates, is mounted so as to be slidable transversely of the longitudinal axis of the chain in such a manner that a number of laminae can form laterally projecting compound driving teeth of variable pitch and shape of outline.

In all known constructions of such chains, the tractive force of the chain is limited. One of the limitations of the tractive forces of chains consists in the fact that, at a definite size of gear, the chains cannot be increased in size, since, otherwise, the engagement relationships in the small running circle would be very unfavourable. In addition, the impact effect is, when the chain runs into the pair of conical discs, dependent upon the weight of the chain link. On increasing the pile of laminae, the end plates and the laminae become heavier, and, indeed, while retaining the width of the chain and increasing only the width of the laminae and the pitch of the chain, the weight of a chain link increases with the square of the linear increase, whilst the transmittable tractive force of the chain increases only linearly with the increase. The ratio between the weight of the chain and the power of the chain is therefore rendered more unfavourable by such expedients.

A further disadvantage of increased plate size results from the fact that the walls of adjacent teeth of the co-operating gear chains usually converge inwardly. Consequently the large plates engaging the teeth will be in tight mutual contact at the narrow areas but will lie loosely at the wider areas between the teeth.

These difficulties are obviated by the present invention which consists in the fact that each chain link contains at least two piles of laminae, the said piles being arranged above one another.

Two examples of embodiment of the subject matter of the invention are represented by the accompanying drawings, of which:

Figure 7:
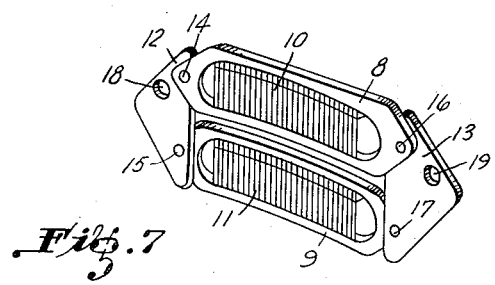

Fig. 7 is an isometric view showing a modification with the bores 18 and 19 of the immediate lugs placed eccentrically and towards the sides of the joint pins 14 and 16.

Figure 1:
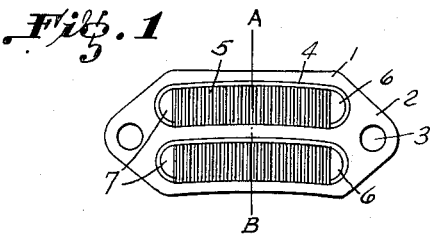
Fig. 1 is a side elevation of one construction of a chain link.
Figure 2:
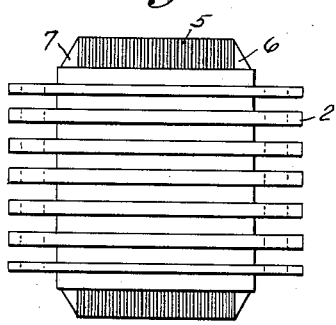
Fig. 2 is a plan corresponding to Fig. 1.
Figure 3:
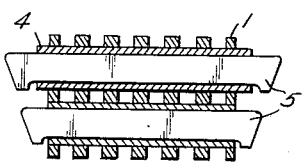
Fig. 3 is a section on the line A—B of Fig. 1.

The chain link shown in Figs. 1 to 3 consists of chain side bars 1 with joint lugs 2 which have holes 3 for the purpose of connection to the next link and are rotatably connected by joint pins. Cages 4 are mounted in the chain side bars as holders for the piles 5 of laminae and the end plates 6 and 7. The laminae are displaceable laterally in order to form the driving teeth and support themselves on the end plates. The laminae adjust themselves radially in accordance with the teeth of the conical discs with which they co-operate. The inclination of the laminae to one another is fixed in accordance with the running circle of the teeth on which they run, with the result that, with a running circle of a small diameter, the number of acting laminae per tooth gap is smaller and, on the other hand, the larger the running circle, the greater is the number of laminae which force themselves into the conical tooth gaps. In this way, therefore, the inclination of the individual laminae to one another is altered.

Each chain link contains at least two piles of laminae and four end plates, so that, while the favourable conditions of engagement are retained, the tractive force of the chain can be considerably increased.

Figure 4:
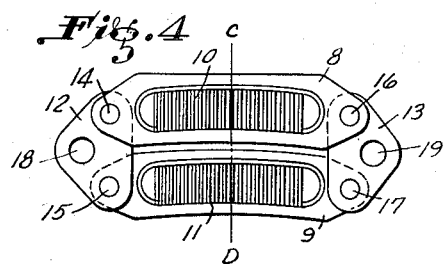
Fig. 4 is a side elevation of another construction of the chain link.
Figure 5:
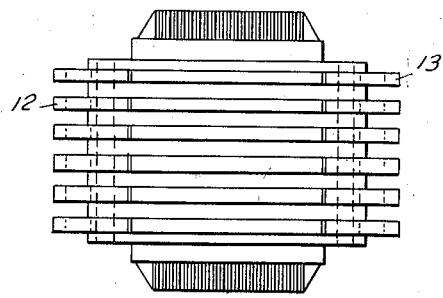
Fig. 5 is a plan corresponding to Fig. 4.
Figure 6:
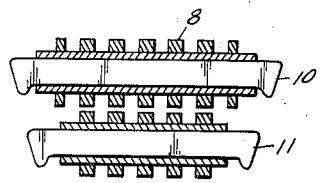
Fig. 6 is a section on the line C—D of Fig. 4.

The chain link shown in Figs. 4 to 6 consists of two individual members 8 and 9 with the piles of laminae 10 and 11, the said members being rotatably connected by intermediate lugs 12 and 13 by means of the joint pins 14–17. The intermediate lugs contain bores 18 and 19 for connection with further chain links by means of joint pins.

In this case, each chain link contains at least two chain members which are connected with intermediate lugs and each having a pile of laminae and two end plates. Owing to the rotatable connection by means of the intermediate lugs, a distribution of the tractive forces of the chain over at least two piles of laminae is ensured.

It is possible, for example, to arrange the bores 18 and 19 of the intermediate lugs eccentrically towards the side of the joint pins 14 and 16, so that the chain member 8 or pile of laminae 10 located on a larger pitch circle has to transmit greater tractive forces of the chain than the chain member 9 or pile of laminae 11.

What is claimed is:

1. A metal chain for toothed wheel driving systems, with transversely displaceable steel laminae in each chain link, each chain link containing at least two piles of laminae, the said piles being radially spaced between the inner and outer peripheries of said chain, characterized by the feature that each chain link consists of at least two individual members which are radially spaced between the inner and outer peripheries of said chain, each individual member containing a pile of laminae, and said individual members being rotatably connected at least at one end to an intermediate connector member.

2. A metal chain for toothed wheel driving systems, constructed in accordance with claim 1, each intermediate connector member being provided with a bore for pin-joining the individual chain links, the said bores being arranged eccentrically toward one peripheral side of the chain.

References Cited in the file of this patent

UNITED STATES PATENTS

| | | |
|---|---|---|
| 1,814,883 | Abbott | Sept. 9, 1930 |
| 2,686,432 | Bergmann | Aug. 17, 1954 |

FOREIGN PATENTS

| | | |
|---|---|---|
| 88,611 | Switzerland | Mar. 16, 1921 |